(12) United States Patent
Beedubail et al.

(10) Patent No.: US 9,455,990 B2
(45) Date of Patent: Sep. 27, 2016

(54) SYSTEM AND METHOD FOR ROLE BASED ACCESS CONTROL IN A CONTENT MANAGEMENT SYSTEM

(75) Inventors: Ganesha Beedubail, Fremont, CA (US); David Mun-Hien Choy, Los Altos, CA (US); Hui-I Hsiao, Saratoga, CA (US); Sriram Raghavan, San Jose, CA (US); Ganesh Vaideeswaran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1932 days.

(21) Appl. No.: 11/459,276

(22) Filed: Jul. 21, 2006

(65) Prior Publication Data
US 2008/0022370 A1    Jan. 24, 2008

(51) Int. Cl.
H04L 29/06     (2006.01)
G06F 21/62     (2013.01)

(52) U.S. Cl.
CPC ......... *H04L 63/102* (2013.01); *G06F 21/6218* (2013.01); *G06F 21/6227* (2013.01); *H04L 63/0428* (2013.01); *H04L 63/08* (2013.01); *H04L 63/101* (2013.01)

(58) Field of Classification Search
CPC ... H04L 63/08; H04L 63/101; H04L 63/102; H04L 63/0428; G06F 21/6218; G06F 21/6227
USPC .............................................. 726/4; 713/167
See application file for complete search history.

(56) References Cited

U.S. PATENT DOCUMENTS

| | | | | |
|---|---|---|---|---|
| 5,173,939 A | * | 12/1992 | Abadi | G06F 9/468 |
| 5,748,890 A | | 5/1998 | Goldberg et al. | |
| 5,768,519 A | * | 6/1998 | Swift et al. | 709/223 |
| 5,787,427 A | * | 7/1998 | Benantar et al. | |
| 5,911,143 A | * | 6/1999 | Deinhart et al. | |
| 6,023,765 A | * | 2/2000 | Kuhn | G06F 21/6218 |
| | | | | 713/166 |
| 6,202,066 B1 | * | 3/2001 | Barkley | G06F 21/6218 |
| | | | | 707/785 |
| 7,260,831 B1 | * | 8/2007 | Beznosov et al. | 726/2 |
| 7,343,628 B2 | * | 3/2008 | Buchholz et al. | 726/28 |
| 7,370,344 B2 | * | 5/2008 | Boozer | G06F 21/6218 |
| | | | | 726/2 |
| 7,461,395 B2 | * | 12/2008 | Ng | 726/1 |
| 7,533,173 B2 | * | 5/2009 | Badovinatz et al. | 709/226 |
| 7,555,769 B1 | * | 6/2009 | Shapiro et al. | 726/1 |
| 7,814,491 B1 | * | 10/2010 | Chen | G06F 9/5016 |
| | | | | 709/226 |
| 8,381,306 B2 | * | 2/2013 | McPherson et al. | 726/27 |
| 2002/0002577 A1 | * | 1/2002 | Garg | G06F 9/4428 |
| | | | | 718/104 |
| 2002/0026592 A1 | | 2/2002 | Gavrila et al. | |

(Continued)

OTHER PUBLICATIONS

Sandhu et al., "Role Based Access Control Models," IEEE Computer, vol. 29, No. 2, Feb. 1996.*

(Continued)

*Primary Examiner* — Kari Schmidt
(74) *Attorney, Agent, or Firm* — Sughrue Mion, PLLC.

(57) ABSTRACT

Embodiments of the present invention provide an efficient and scalable scheme for role-based access control to resources. The resources are assigned a protection class. Resources in the same protection class share the same access control policy. Permissions granted to various roles are then defined based on privilege sets and protection classes. Accordingly, the permissions of a role can be dynamically determined at runtime. Furthermore, as new resources are added, they can be assigned to a pre-existing protection class. The new resource may thus automatically inherit the various permissions and roles attached to the protection class.

27 Claims, 5 Drawing Sheets

(56) References Cited

U.S. PATENT DOCUMENTS

| | | |
|---|---|---|
| 2002/0184521 A1 | 12/2002 | Lucovsky et al. |
| 2003/0005297 A1* | 1/2003 | Fichtner et al. ............. 713/168 |
| 2003/0018910 A1 | 1/2003 | Wert et al. |
| 2003/0046576 A1 | 3/2003 | High, Jr. et al. |
| 2003/0221012 A1 | 11/2003 | Herrmann et al. |
| 2004/0093526 A1 | 5/2004 | Hirsch |
| 2004/0098594 A1 | 5/2004 | Fleming et al. |
| 2004/0230795 A1* | 11/2004 | Armitano et al. ............ 713/165 |
| 2004/0250098 A1 | 12/2004 | Licis |
| 2005/0055573 A1 | 3/2005 | Smith |
| 2005/0132220 A1* | 6/2005 | Chang ................. H04L 63/101 726/4 |
| 2005/0132224 A1 | 6/2005 | Estrada et al. |
| 2006/0005254 A1* | 1/2006 | Ross ............................... 726/27 |
| 2006/0218394 A1* | 9/2006 | Yang ............................. 713/167 |
| 2007/0073784 A1* | 3/2007 | McVeigh et al. ............ 707/200 |
| 2007/0162749 A1* | 7/2007 | Lim .............................. 713/167 |
| 2007/0214497 A1* | 9/2007 | Montgomery et al. ........... 726/4 |
| 2007/0266006 A1* | 11/2007 | Buss ................................ 707/3 |
| 2007/0282841 A1* | 12/2007 | Sreedhar .......................... 707/9 |

OTHER PUBLICATIONS

Han, Yan, Liu Fengyu, and Zhang Hong. "An object-oriented model of access control based on role." ACM SIGSOFT Software Engineering Notes 25.2 (2000): 64-68.*

Karjoth, Günter. "Access control with IBM Tivoli access manager." ACM Transactions on Information and System Security (TISSEC) 6.2 (2003): 232-257.*

Ryutov, Tatyana, and Clifford Neuman. "Representation and evaluation of security policies for distributed system services." DARPA Information Survivability Conference and Exposition, 2000. DISCEX'00. Proceedings. vol. 2. IEEE, 2000: pp. 172-183.*

* cited by examiner

FIG. 3

| Role Id 302 | User ID 304 |
|---|---|
| | |
| | |
| | |
| | |

Role-User Table 300

FIG. 4

| Role ID 402 | Protection Class 404 | Privilege Set 406 |
|---|---|---|
| | | |
| | | |
| | | |
| | | |
| | | |

Resource Control List Table 400

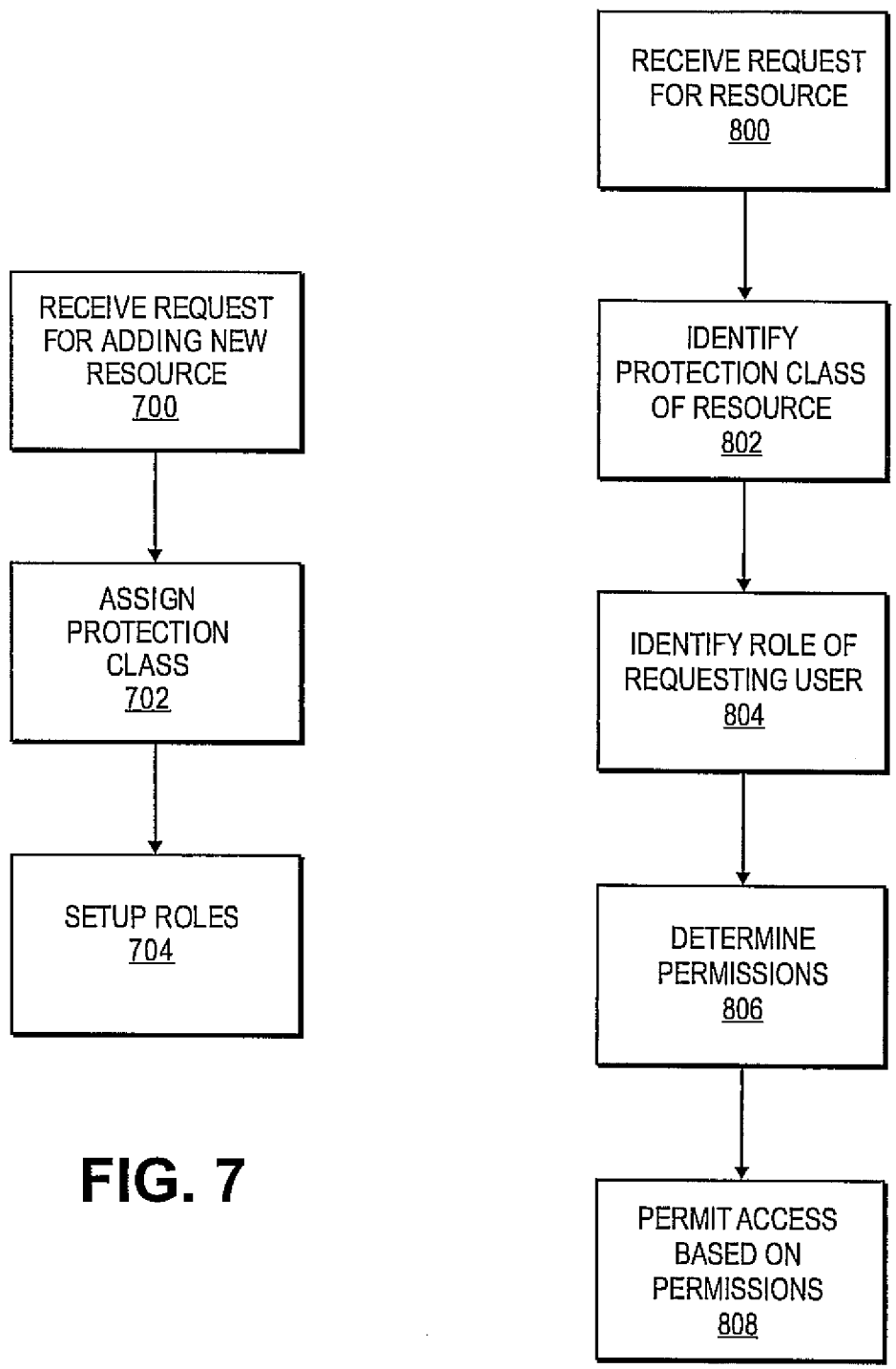

SYSTEM AND METHOD FOR ROLE BASED ACCESS CONTROL IN A CONTENT MANAGEMENT SYSTEM

FIELD

The present invention relates to content management systems and, more particularly, to a system and method for role based access control in a content management system.

BACKGROUND

A content management system is a computer software system for organizing and facilitating collaborative creation of computer resources. A computer resource refers to a computer media file, a computer program, a computer document, or any other computer content. A content management system is frequently a web application used for managing websites and web content, though in many cases, content management systems require special client software for editing and constructing resources.

In role-based access control (RBAC) systems, access to a computer system is provided to groups of users, termed "roles." All users belonging to a given role have the same privileges to access the system. Users are then granted access depending on their membership in appropriate roles.

RBAC is considered useful in many commercial environments because it allows access to the computer system to be organized along lines corresponding to the actual duties and responsibilities of individuals within commercial organizations. Various types of access privileges can be organized as a function of role assignments. A particular advantage of RBAC is that it allows the access privileges provided to users to be reconfigured as the individuals change roles, simply by deleting one's original assignment to a first role and adding one to the new role.

A problem in adapting RBAC to a content management system is that when a resource is added to the content management system, the access privileges related to the resource must be assigned to a particular role or set of roles. Thus, a system administrator must manually assign these privileges when a resource is added to the system. This is cumbersome and in many instances impractical for a large and dynamic system. What is needed is RBAC for a content management system that is dynamic and easily scalable as resources are added to the content management system.

SUMMARY

In accordance with the present invention, a method of controlling access to a resource is provided. A request is received from a user for access to a resource. A protection class of the resource and a role assigned to the user are determined. Permissions that have been granted to the role are determined based on a set of privileges assigned to the role and the protection class of the resource. Permissions are thus a set of privileges associated with a protection class. Access to the resource is then permitted based on the set of privileges.

In accordance with another feature of the present invention, a method of automatically assigning permissions to a resource is provided. A request to add the resource is received. A protection class is assigned to the resource. Roles that will be granted permissions to the resource are then automatically assigned to the resource based on a set of privileges defined for each role and the protection class of the resource.

In accordance with another feature of the present invention, a role based access control system is provided. One or more storage mediums comprise a first data structure that indicates roles assigned to users of the access control system, and a second data structure that defines, for each role, a protection class comprising a set of resources and a set of privileges for accessing the set of resources in the protection class. The system also includes a processor configured to receive a request for access to one of the set of resources, determining the role assigned to the user based on the first data structure, determine permissions that have been granted to the role based on the second data structure, and permit access to the resource based on the permissions.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that bolt the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3 illustrates an example of a role-user table that is in accordance with the principles of the present invention;

FIG. 4 illustrates an example of a role control list table that is in accordance with the principles of the present invention;

FIG. 7 illustrates an exemplary process of determining which permissions are attached to a new resource; and FIG. 8 illustrates an exemplary process of how access controls are applied to various resources.

DESCRIPTION OF THE EMBODIMENTS

Embodiments of the present invention provide an efficient and scalable scheme for role-based access control to resources using the concept of a "protection class." The resources are assigned a protection class, which is used to define a shared access control policy. Permissions granted to various roles are then defined based on privilege sets and protection classes A role may be defined as a combination of its identifier (or name) and the permissions granted. The permissions represent a set of privileges for operations within the scope of the protection class. In some embodiments, data structures are utilized to create a list of tuples that represent each role as a set of privileges granted within the protection class.

The permissions of a role can be dynamically determined at runtime rather than at the time of creating the role. Furthermore, as new resources are added, they can be assigned to a pre-existing protection class. The new resource may thus automatically inherit the various permissions and roles attached to the protection class.

The concept of protection classes allows for the flexible and dynamic binding of resources to an access control policy of various roles. That is, the permissions of roles are indirectly derived (rather than explicitly defined at the time of creation of the role) from the privileges and protection class bound to that role. Resources, by belonging to the same protection class, can thus share the same access control policy without any explicit relationships. In addition, resources may have their access control policies changed without having to change their relationship to other resources. Hence, resources, from an access control policy perspective, need not be organized by any explicit structure. A resource can also belong to multiple protection classes.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
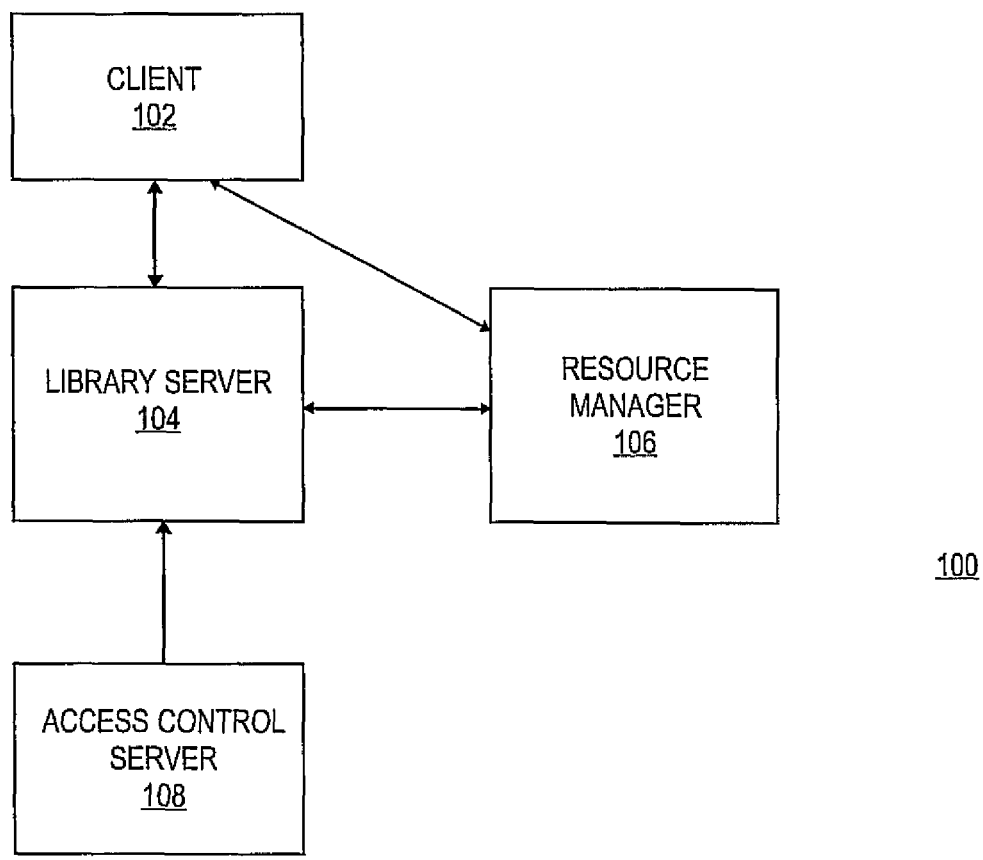
FIG. 1 depicts a block diagram of a content management system 100, in accordance with systems and methods consistent with the present invention.

FIG. 1 shows a content management system 100 that is consistent with the principles of the present invention. As shown, content management system 100 may comprise a client 102, a library server 104, a resource manager 106, and an access control system 108. These components may be coupled together using one or more networks, such as a local area network, or wide area network. In addition, these components may communicate with each other using known protocols, such as the transport control protocol and Internet protocol ("TCP/IP") and hypertext transport protocol ("HTTP").

The components of content management system 100 may be implemented on separate devices or may be implemented on one or more of the same devices or systems. For example, library server 104, resource manager 106, and access control server 108 may be installed on the same machine and run under a common operating system. As another example, it is also possible to embed access control system 108 into library server 104. Alternatively, content management system 100 may have one or more of its components implemented on multiple machines that run different operating systems. Some of the specific components of content management system 100 will now be described.

Client 102 provides a user interface for content management system 100. Client 102 may be implemented using a variety of devices and software. For example client 102 may be implemented on a personal computer, workstation, or terminal. In addition, client 102 may run under a Windows operating system, or through a browser application, such as Internet Explorer by Microsoft Corporation, Firefox by Mozilla, or Netscape Navigator by Netscape Communications Corporation. Although FIG. 1 shows a single client, content management system 100 may include any number of clients.

Library server 104 stores, manages, and provides access control to items stored by content management system 100. Library server 104 processes requests, such as creates, reads, updates, and deletes, from client 102 and maintains the data integrity between the other components of content management system 100, such as resource manager 106. For example, library server 104 may work in conjunction with resource manager 106 to retrieve an object, such as a document or image file, that is referenced by an item.

Library server 104 may be implemented using a variety of devices and software. For example, library server 104 may be a computer that runs one or more application programs and stored procedures under an operating system, such as z/OS, Windows, AIX, or Solaris. In addition, library server 104 may include a database management system, such as a relational database management system, to manage stored items and perform searches for content management system 100. For example, library server 104 may use the DB2 Universal Database by International Business Machines Corporation.

Resource manager 106 stores objects corresponding to items in content management system 100. Objects may be any data entity for an item that is in digital form. For example, an object may be an audio file, an application, an image, text, or a video file. Resource manager 106 may store the objects in various formats, such as JPEG images, MP3 audio, AVI video, and ASCII text. Resource manager 106 may also store objects in formats, such as Microsoft Word, Lotus Word Pro, and Wordperfect.

Furthermore, resource manager 106 may also be configured to store multiple copies of objects on the same or a separate resource manager (not shown). Although FIG. 1 shows a single resource manager, content management system 100 may include any number of resource managers. For example, content management system 100 may include multiple resource managers that are distributed across one or networks.

Resource manager 106 may be implemented using known devices and software. For example, resource manager 106 may be installed on one or more computers that run under the z/OS operating system, and includes a DB2 Universal Database, as well as a server to communicate with client 102 and library server 104, such as a HTTP server. In addition, resource manager 106 may include one or more memories or storage devices, such as a magnetic disc drive.

Access control server 108 manages access to the objects and resources stored by system 100. Access control server 108 manages the roles of users of system 100, processes requests, such as creates, reads, updates, and deletes, from client 102 based on the roles of the users, and access control between the other components of content management system 100, such as resource manager 106. For example, access control server 108 can be an embedded component of library server 104 and may work in conjunction with library server 104 and resource manager 106 to retrieve an object or resource, such as a document or image file, that is referenced by an item and requested by a user.

In some embodiments, access control server 108 utilizes the concept of "protection classes" for the resources and defines the permissions of various roles based on a combination of these protection classes and sets of privileges. A protection class may be essentially a group of any number of resources or objects that share an access control policy enforced by access control server 108. Privilege sets describe the operations, such as read, edit, etc., that are to be granted to a particular role. Permissions are thus a set of privileges associated with a protection class.

In some embodiments, access control server 108 maintains various role control lists that correlate the privilege sets and protection classes attached to each role. Role control lists are an implementation manifestation. That is, a role control list may be any form of data structure that represents permissions associated with a role. Hence, role control lists may be used to implement the access control policy associated with a protection class.

Access control server 108 may be implemented using known devices and software. For example, access control server 108 may be installed on one or more computers that run under the z/OS operating system, and includes a DB2 Universal Database, as well as a server to communicate with client 102, library 104, or resource manager 106. In addition, resource manager 106 may include one or more memories or storage devices, such as a magnetic disc drive. Access control server 108 is further described with reference to FIG. 2.

Figure 2:
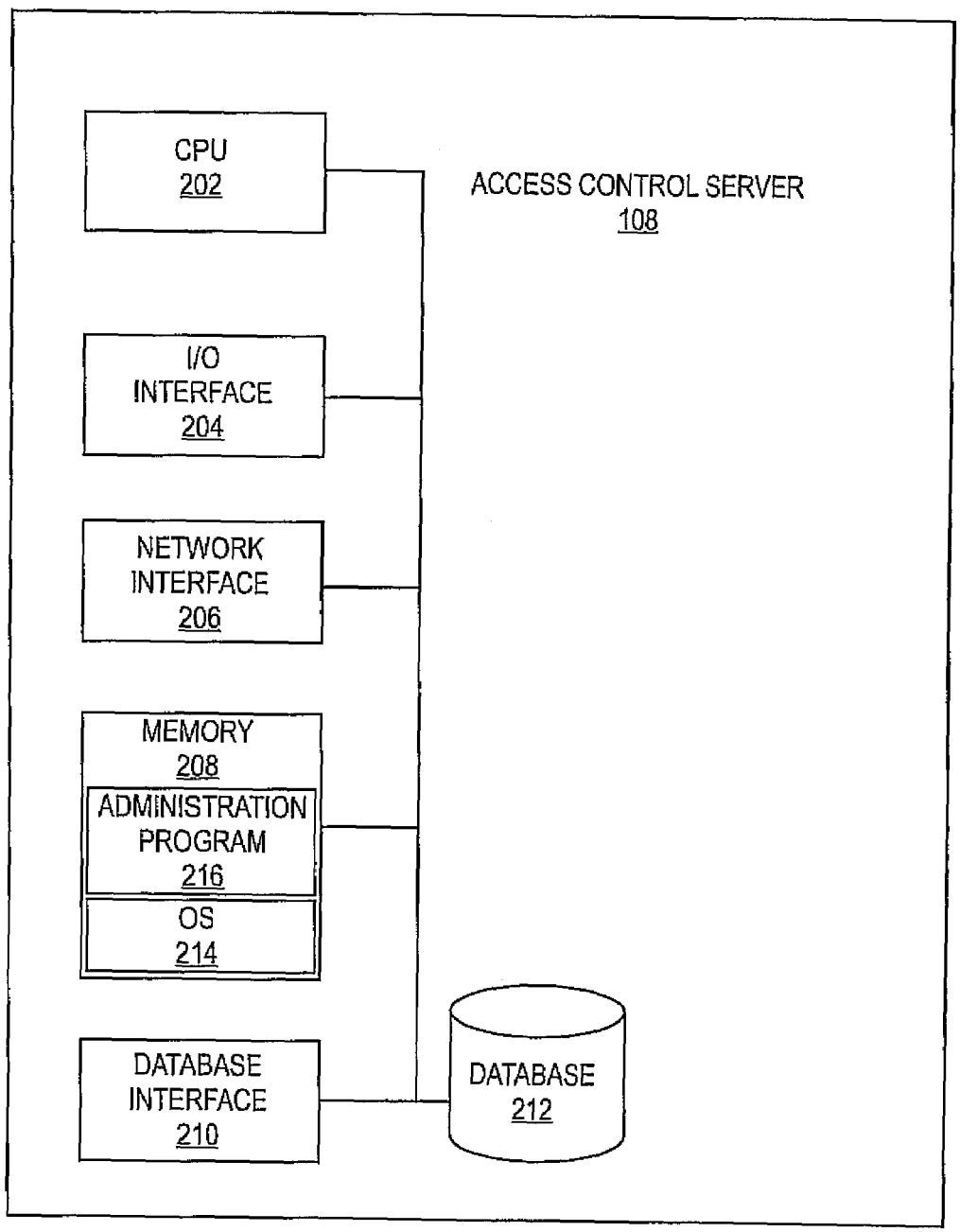
FIG. 2 depicts a block diagram of an exemplary access control server 108, in accordance with systems and methods consistent with the present invention.

FIG. 2 depicts a block diagram of an exemplary access control server 108, in accordance with systems and methods consistent with the present invention. As shown, access control server 108 may include a central processing unit (CPU) 202, an I/O interface 204, a network interface 206, a memory 208, a database interface 210, and a database 212.

CPU 202 executes instructions associated with the applications contained in memory 210 and transmits results to other components of access control server 108. I/O interface 204 is an interface used to couple access control server 108 with local devices, such as a keyboard, a mouse, a display device, and any other I/O device useful in operating and managing access control server 108 as is understood by one of skill in the art. Network interface 206 may be used to communicate with the other components of system 100 over a network. Memory 208 may server as the primary memory of access control server 108 for running an operating system 214 and an administration program 216. Database interface 210 may be used to communicate with database 212. Although database 212 is shown locally coupled to access control server 108, one skilled in the art will recognize that database 212 may also be remotely coupled to access control server 108.

Database 212 serves as a catalog for the roles assigned to the users and the permissions granted to the roles. For example, database 212 may comprise one or more data structures that indicate each role assigned to various users and privileges and protection classes that each role has been granted. Examples of such data structures are also shown in FIGS. 3 and 4.

Operating system 214 is an integrated collection of routines that service the sequencing and processing of programs and applications by access control server 108. OS 214 may provide many services, such as resource allocation, scheduling, input/output control, and data management. OS 214 may be predominantly software, but may also comprise partial or complete hardware implementations and firmware. Examples of operating systems that are consistent with the principles of the present invention are well known to those skilled in the art.

Administration program 216 is program code that implements the functions and procedures of access control server 108. For example, administration program 216 may provide various functions for assigning roles to users, associating permissions (set of privileges and its associated protection class) with roles, assigning protection classes to resources or objects stored by resource manager 106, evaluate access requests by users based on the role of the user and protection class of the requested resource. Administration program 216 may be written in a variety of host programming languages, such as C, C++, Java, or COBOL.

In order to assist in the explanation of the principles of the present invention, the following scenario is provided. System 100 may be a system implemented by an insurance company to manage its insurance policy documents. As one can imagine, various classes of documents may be insurance policy documents, such as the policy document itself, claims documents, and the like. Each class may be provided its own protection class, such as "POLICY_DOCS" and "CLAIM_DOCS." Claims adjusters of the insurance company may be assigned a role named "ADJUSTER," while sales people may be assigned a role named "SALES."

A user in the ADJUSTER role may be granted only viewing rights for documents in the POLICY_DOCS protection class, but allowed full edit rights for documents in the CLAIMS_DOCS protection class due to the nature of their position. Likewise, a user in the SALES role may be granted full edit rights for documents in the POLICY_DOCS protection class, but precluded from accessing documents in the CLAIMS_DOCS class. Of course one skilled in the art will recognize that this is merely an exemplary description and that a wide variety of variations and applications may be embodied in accordance with the present invention.

Figure 5:
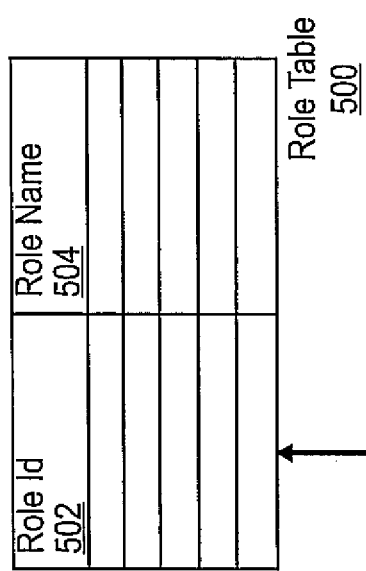
FIG. 5 illustrates an example of a role table that is in accordance with the principles of the present invention.
Figure 6:
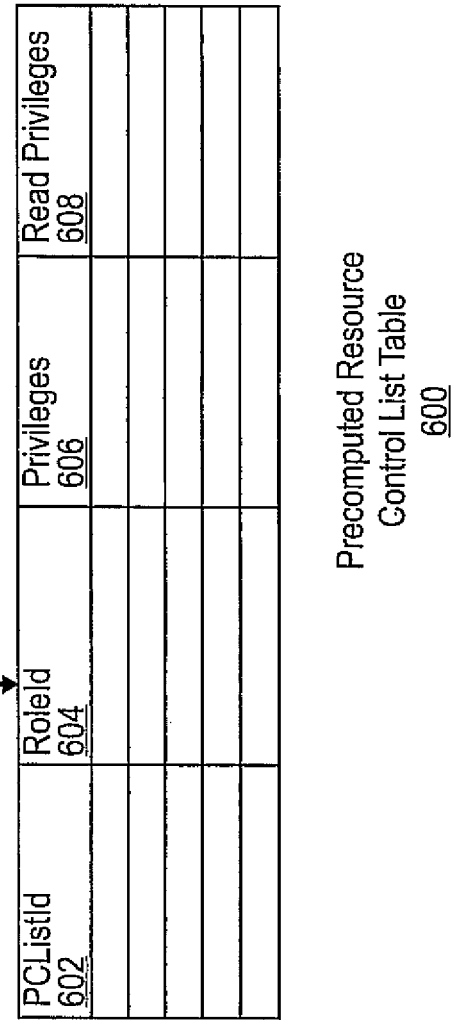
FIG. 6 illustrates an example of precomputed role control list table that is in accordance with the principles of the present invention.

FIGS. 3, 4, 5, and 6 illustrate examples a table schema for the efficient determination of permissions in system 100. In particular, FIG. 3 illustrates an example of a role-user table 300. FIG. 4 illustrates an example of a role control list table 400. FIG. 5 illustrates an example of a role table 500. FIG. 6 illustrates an example of precomputed role control list table 600. One skilled in the art will recognize that these figures show only some of the tables that may be used. One skilled in the art will also recognize that other tables may be used to hold the definitions of the entities involved in embodiments of the invention that are not shown.

Referring now to FIGS. 3 and 4, role-user table 300 may include a role identification column 302 and a user identification column 304. Likewise, role control list table 400 may also include a role identification column 402, a protection class column 404, and a privilege set column 406. In some embodiments, an access control list is compiled into relational database tables such that privileges associated with a given role can be extracted and kept in separate rows or tuples. Accordingly, in these embodiments, system 100 may employ runtime access control checking by performing joins of these tables using the requesting user's identification as a calling predicate. Some examples of these tables and the information they provide will now be further described.

Role-user table 300 provides a data structure that indicates the roles assigned to each user. A user may be assigned multiple roles and, of course, multiple users may be assigned to a role. The roles supported by system 100 may be structured in various ways, such as a hierarchy. For example, higher level roles may inherit the permissions and characteristics of one or more lower level roles. Other schemes for arranging roles are well known to those skilled in the art. In some embodiments, table 300 may be implemented as a relational database table. Of course, other data structures, such as an object oriented data structure, may be used in accordance with the principles of the present invention. As shown, role-user table 300 may comprise table having tuples that correlate users to their assigned roles. The columns of exemplary table 300 will now be further described.

Role identification column 302 contains information that identifies each role supported by system 100. For example, as noted in the scenario above, ADJUSTER and SALES may be roles supported by system 100. Role identification column 302 may use various types of identifiers in such as numeric, alphanumeric or some combination thereof. A role's identification (or name) may be manually designated, for example, by an administrator of system 100, or alternatively may be automatically generated by access control server 108 or some other component of system 100.

User identification column 304 contains information that identifies each user supported by system 100. User identification column 304 may use various types of identifiers in such as numeric, alphanumeric or some combination thereof. A user's identification (or name) may be manually designated, for example, by the user or an administrator of system 100, or alternatively may be automatically generated by access control server 108 or some other component of system 100.

In some embodiments, instead of de-normalizing groups into individual users in role-user table 300, a role-group table (not shown) may be employed in system 100. The join predicate may then be modified to include the role-group table. Such a table schema may be used, for example, where it desirable to reduce size of the role-user table 300 substantially or increase the runtime performance of system 100.

Continuing now to FIG. 4, role control list table 400 provides a data structure that generally indicates the access control policy for various protection classes. As noted, each resource or object stored by system 100 is assigned a protection class. Table 400 then provides a data structure that correlates various roles to the privileges they are granted within a particular protection class. For example, using the scenario noted above, users in the ADJUSTER role may be full edit privileges to resources in the CLAIMS_DOCS protection class. In some embodiments, table 400 may be implemented as a relational database table. Of course, other data structures, such as an object oriented data structure, may be used in accordance with the principles of the present invention. As shown, table 400 represents a role-permission tuple that correlates various roles to the specific privileges granted to them within each protection class of resource and objects of system 100. One skilled in the art will recognize that this permits dynamic assignment of permissions to various roles at runtime of system 100 even after the role has been created. In contrast, typical systems generally require that roles be assigned their privileges at the time of creation. The columns of exemplary table 400 will now be further described.

Role identification column 402 may contain the same information as role identification column 302. Hence, in those embodiments where tables 300 and 400 are part of a relational database, role identification can serve as key for various operations and queries. For example, tables 300 and 400 may be joined in various ways by access control server 108 to control access to the objects and resources of system 100.

Protection class column 404 contains information that the protection classes used by system 100. For example, as noted in the scenario above, POLICY_DOCS and CLAIMS_ DOCS may be protection classes used by system 100. Protection class column 404 may use various types of identifiers in such as numeric, alphanumeric or some combination thereof. A protection class (or name) may be manually designated, for example, by an administrator of system 100, or alternatively may be automatically generated by access control server 108 or some other component of system 100.

Privilege set 406 indicates one or more privileges granted to a role within a given protection class. For example, in the scenario above, full edit privileges have been granted to the ADJUSTERS roles for documents within the CLAIMS_ DOCS protection class. A privilege set may comprise one or more operations, such as read, update, delete, create, etc. The identifier or name for the privilege set may be manually designated, for example, by an administrator of system 100, or alternatively may be automatically generated by access control server 108 or some other component of system 100.

Referring now to FIG. 5, a role table 500 is shown. Role table 500 provides a data structure that indicates role definitions for each of the roles. Accordingly, in some embodiments, role table 500 may comprise a RoleId column 502 and a RoleName column 504. RoleId column 502 indicates an identifier, such as a numeric or alphanumeric identifier for a role.

RoleName column 504 indicates a name for a role. Hence, a role is comprises a role name that is associated with a set of permissions. As noted, permissions further comprise a privilege set and a protection class. Each role may comprise multiple sets of permissions.

For example, assume that a company uses system 100 to manage its computer-aided design (CAD) documents. An administrator of system 100 may then define a protection class "CADDOCS," and a role CADENGR as {EDIT+ CADDOCS}. That is, the name of the role is CADENGR, the privileges associated with the role are EDIT privileges, and the scope (influence) of the role is the CADDOCS protection class. As another example, the administrator may define a role CADMGR as {READ+CADDOCS}. That is, the name of the role is CADMGR, the privileges associated with the role are READ privileges, and the scope of the role is again the CADDOCS protection class. Various users can then be assigned to one or more of these roles.

During the regular use of system 100, as users create CAD documents, they may add these documents to the repository managed by resource manager 106. However, by virtue of the configuration of system 100, these documents get added to CADDOC protection class (i.e., the protection class of the documents is set to CADDOCS). Subsequently, the users with CADENGR role can "EDIT" the documents and users with CADMGR role can "READ" the documents.

FIG. 6 shows a precomputed role control list (PCRCL) table 600 that may store the pre-processed or precomputed values used in role control lists. In some embodiments, PCRCL table 600 is optimized for run time access checks by access control server 108. PCRCL table 600 allows for the extraction of privileges associated with a role against a set of protection classes. Thus, as shown, in FIG. 6, PCRCL table 600 may comprise a protection class list identifier (PClistId) column 602, a RoleId column 604, a privileges column 606, and a read privileges column 608.

PClistID column 602 provides information that indicates the protection classes to be associated with a role. RoleId column 604 provides the information that identifies a role. Privileges column 606 indicates the privileges for a role having a particular PClistId. Read privileges column 608 indicates whether a role has a read privilege into a particular PClistId.

Reference will now be made to FIGS. 7 and 8 to describe some of the processes that are consistent with the present invention. FIG. 7 illustrates an exemplary process of determining which permissions are attached to a new resource. FIG. 8 illustrates an exemplary process of how access controls are applied to various resources. Where helpful, the scenario described above will be utilized to explain some of the aspects of these processes.

In FIG. 7, processing may begin at stage 700. In stage 700, system 100 receives a request to add a resource. For example, a user at client 102 may request that a new person's policy be added as an insurance policy document. Library server 104 may initially receive this request and perform some initial processing, such as an authentication check, or locating resource manager 106, which will store the new document as a resource of system 100. Library server 104 may then forward the request to access control server 108 to determine the appropriate access control policy that should be applied to this request. Processing then flows to stage 502.

In stage 702, access control server 108 assigns a protection class to the resource. Access control server 108 may assign the protection class based on input from a user (that has the appropriate role), or an administrator of system 100. Alternatively, access control server 108 may automatically assign the protection class based on various characteristics of the new resource, such as the file name, file type, location of client 102, etc. Furthermore, access control server 108 may assign the protection class at different times. For example, access control server 108 may assign protection class immediately upon receiving the request. Alternatively, access control server 108 may wait until receiving an acknowledgment or some other message from library server 104 or resource manager 106. This type of deferred assignment may be appropriate to ensure that a resource is not assigned a protection class until after it has been accepted and stored in system 100. Of course, one skilled in the art will recognize that other timing protocols may be used by system 100. Processing may then generally flow to stage 504.

In stage 704, roles are setup in system 100. In particular, access control server 108 associates roles with various permissions, where each of the permissions comprise a set of privileges associated with a protection class. Users can then be assigned to roles by system 100. Access control server 108 may then update its table schema, such as tables 300, 400, 500, and 600.

One skilled in the art will recognize that this schema is more dynamic and scalable than known techniques. In addition, this schema also allows for runtime application of access control policies. These and other features of the present invention can be readily understood by those skilled in the art.

Referring now to FIG. 8, a method of controlling access to a resource is shown. In stage 800, system 100 receives a request for access to a resource from a user. For example, a user at client 102 may request access to a person's insurance claim from their insurance history. Library server 104 may initially receive this request and perform some initial processing, such as an authentication check, or locating resource manager 106, which stored the insurance claim as a resource of system 100. Library server 104 and resource manager 106 may also operate in conjunction to determine the protection class of the requested resource. This information may be stored as one or more pointers in the databases of resource manager 106 or in the databases of library server 104. Library server 104 may then forward the request to access control server 108 to determine the appropriate access control policy that should be applied to this request. Processing then flows to stage 802.

In stage 802, access control server 108 determines protection classes of the resource. In particular, access control server 108 may identify the protection classes affected by the request based on information passed from library server 104 or resource manager 106. For example, access control server 108 may be provided a list of protection classes that has been attached to information about the requested resource by querying, for example, one or more the tables shown in FIGS. 3-6. In the scenario previously noted, an insurance claim may generally be assigned to just one protection class, such as CLAIMS_DOCS.

Simultaneously or at some other time, in stage 804, access control server 108 may also determine a role assigned to the user. Again, this information may be determined from information passed from library server 104. For example, library server 104 may perform a query of the table schema shown in FIGS. 3-6 for the user at client 102 and determine that the user's identifier is John Smith. Access control server 108 may then query role-user table 300 and identify that John Smith is assigned the role of ADJUSTER.

In stage 806, access control server 108 determines privileges that have been granted to the role for the list of protection classes to which the resource belongs. In particular, access control server 108 may query PCRCL table 600 and role table 500 to determine privileges of the role ADJUSTER and the protection class of CLAIMS_DOCS. Based on the information in these tables, access control server 108 may thus identify that the ADJUSTER role has been granted full edit privileges within the CLAIMS_DOCS. Processing may then flow to stage 808.

In stage 808, access control server 108 permits access to the resource based on the permissions. As noted, the permissions represent a set of privileges (or operations) that are associated with the role within the given protection class. Access control server 108 may send one or more messages to library server 104 and resource manager 106. These messages may contain information that indicates the privileges and access control policy to be applied to the request. For example, the message may simply indicate a list of operations in the privilege set of the permissions and whether the operation is permitted or denied. Other message types and data within these messages are known to those skilled in the art. Library server 104 and resource manager 106 may then respond to access control server 108 and permit access to the requested resource in accordance with the access control policy indicated.

For example, the following pseudo code illustrates an algorithm that may be performed by access control server 108 to update its table schema. In this example, the PClist is retrieved from the resource or may be indicated in PCRCL table 600 and serves as a handle or pointer to the effective resource control list that gets attached to the resource, when the resource is attached to one or more protection classes. Accordingly, the following pseudo code provides one example of an algorithm for permission evaluation.

```
hasPermission(user, PClist, reqPermission)
{
    permset = Select Prive from RUTable, PCRCLTable
        where   (user = RUTable.userID)
            AND (RUTable.RoleId = PCRCLTable.RoleId)
            AND (PCRCLTable.PCid = PClist)
    If (reqPermission is in permset) return TRUE;
}
```

As another example, following is pseudo code that implements another algorithm for permission evaluation. In this example, the resource is also stored in the tables and the query is augmented to include a 'join predicate' such that the returned rows (resources) are validated with respect to a read permission.

```
QueryWithOutCheckPermission(user)
{
    Select 'item columns' from DataTables
        Where "user query predicate".
}
```

As yet another example, the following is pseudo code that is a modified version of the permission evaluation noted above. In this example, the permission check is performed, such that the query returns only those items (resources) to which user has a read privilege.

```
QueryWithCheckPermission(user)
{
   Select 'item columns' from DataTables
       Where "user query predicate".
       AND
       (Item.PClist = PCRCLTable.PClist ) AND
       (1 = PCRCLTable.Rpriv)
       AND
       (PCRCLTable.RoleId = RUTable.RoleId) AND
       (user = RUTable.userID)
}
```

The above pseudo code is merely provided as examples and one skilled in the art will recognize that the present invention can be implemented with various algorithms and program code. The present invention can be implemented as a computer program product that includes a computer program mechanism embedded in a computer readable storage medium. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:
   receiving, by at least one processor of a library server, a request from a requestor client to access a resource from a resource manager database;
   retrieving, by the at least one processor of the library server, a role of the requestor client from an access control server for accessing the database;
   permitting, by the at least one processor of the library server, the requestor client to access a resource based on the role of the requestor client, a protection class to which the resource belongs and a set of privileges,
   wherein the protection class comprises a set of resources that share an access control policy independent of any relationships among resources; and
   wherein the role is correlated to the set of privileges within the protection class, and
   wherein the protection class dynamically binds the set of resources such that the set of privileges to the role is implicitly derived during run time from the privileges associated with the protection class bound to the role.

2. The method of claim 1, wherein permitting the requestor client to access the resource further comprises permitting the requestor client to perform a set of operations on the resource.

3. The method of claim 1, wherein permitting the requestor client to access the resource further comprises dynamically determining the set of privileges that are granted to the role at runtime.

4. The method of claim 1, wherein permitting the requestor client to access the resource further comprises identifying a pointer to the protection class.

5. The method of claim 1, wherein permitting the requestor client to access the resource further comprises determining a plurality of protection classes of the resource.

6. The method of claim 1, wherein permitting the requestor client to access the resource further comprises receiving a list of protection classes attached to information about the requested access to the resource.

7. The method of claim 1, wherein the protection class is based on a document type of the resource, wherein resources of a first document type are classified as a first protection class, and resources of a second document type are classified as a second protection class.

8. The computer-implemented method of claim 1, wherein the permitting the requestor client to access the resource comprises:
   determining the protection class of the resource and the role of the user by querying a database table that contains information on protection classes and roles;
   determining privileges that are granted to the role for the protection class to which the resource belongs based on a result of the querying the database table; and
   permitting access to the resource based on the determined privileges.

9. A library server comprising:
   a hardware processor configured to:
   receive a request from a requestor client to access a resource from the resource manager database;
   retrieve a role of the requestor client from an access control server for accessing the database;
   permit the requestor client to access the resource based on the role of the requestor client, a protection class to which the resource belongs and a set of privileges,
   wherein the protection class comprises a set of resources that share an access control policy independent of any relationships among resources; and
   wherein the role is correlated to the set of privileges within the protection class, and
   wherein the protection class dynamically binds the set of resources such that the set of privileges to the role is implicitly derived during run time from the privileges associated with the protection class bound to the role.

10. A computer readable storage medium, the computer readable storage medium not being a signal, comprising executable instructions for performing a method comprising:
   receiving, by at least one processor of a library server, a request from a requestor client to access a resource from a database;
   retrieving, by the at least one processor of the library server, a role of the requestor client from an access control server for accessing the database;
   permitting, by the at least one processor of the library server, the requestor client to access a resource based on the role of the requestor client, a protection class to which the resource belongs and a set of privileges,
   wherein the protection class comprises a set of resources that share an access control policy independent of any relationships among resources; and
   wherein the role is correlated to the set of privileges within the protection class, and
   wherein the protection class dynamically binds the set of resources such that the set of privileges to the role is implicitly derived during run time from the privileges associated with the protection class bound to the role.

11. A computer-implemented method comprising:
  receiving, by at least one processor of a library server, a request to add a resource to a resource manager database from a requestor client;
  determining, by the at least one processor, a protection class for the resource, the protection class comprising a set of resources that share an access control policy independent of any relationships among resources;
  assigning, by at least one processor of the library server, the resource to the protection class; and
  assigning, by the at least one processor of the library server, a set of privileges associated with the protection class to a role,
  wherein the role is correlated to the set of privileges within the protection class, and
  wherein the protection class dynamically binds the set of resources such that the set of privileges to the role is implicitly derived during run time from the privileges associated with the protection class bound to the role.

12. The method of claim 11, wherein assigning the resource to the protection class further comprises receiving an input from a requestor client that indicates the protection class.

13. The method of claim 11, wherein assigning the resource to the protection class further comprises automatically assigning the resource to the protection class based on a characteristic of the resource.

14. The method of claim 13, wherein assigning the resource to the protection class further comprises assigning the resource to the protection class based on a name of the resource.

15. The method of claim 13, wherein assigning the resource to the protection class further comprises assigning the resource to the protection class based on a file type of the resource.

16. The method of claim 13, wherein assigning the resource to the protection class further comprises assigning the resource to the protection class based on a role of a requestor client that requested assigning of the resource.

17. The method of claim 13, wherein assigning the resource to protection class further comprises assigning the resource to the protection class based on a storage location of the resource.

18. A library server comprising:
  a hardware processor configured to:
  receive a request to add a resource to a resource manager database from a requestor client;
  determine a protection class for the resource, the protection class comprising a set of resources that share an access control policy independent of any relationships among resources;
  assign the resource to the protection class; and
  assign a set of privileges associated with the protection class to a role,
  wherein the role is correlated to the set of privileges within the protection class, and
  wherein the protection class dynamically binds the set of resources such that the set of privileges to the role is implicitly derived during run time from the privileges associated with the protection class bound to the role.

19. A computer readable storage medium, the computer readable storage medium not being a signal, comprising executable instructions for performing a method comprising:
  receiving, by at least one processor a library server, a request to add a resource to a resource manager database from a requestor client;
  determining, by the at least one processor of the library server, a protection class for the resource, the protection class comprising a set of resources that share an access control policy independent of any relationships among resources;
  assigning the resource to the protection class; and
  assigning a set of privileges associated with the protection class to a role,
  wherein the role is correlated to the set of privileges within the protection class, and
  wherein the protection class dynamically binds the set of resources such that the set of privileges to the role is implicitly derived during run time from the privileges associated with the protection class bound to the role.

20. A system comprising:
  at least one storage device comprising a first data structure that indicates roles assigned to members of an access control system, and a second data structure that defines, for each role, a protection class comprising a set of resources that share an access control policy independent of any relationships among resources and a set of privileges for accessing the set of resources in the protection class; and
  a hardware processor of a library server configured to:
  receive a request from a requestor client to access the set of resources from a resource manager database;
  retrieve a role of the requestor client from an access control server, which manages access control information for accessing the resource manager database;
  permit requestor client to access a resource among the set of resources based on the role of the requestor client among the roles in the first data structure, and based on the protection class and the set of privileges defined in the second data structure,
  wherein the role is correlated to the set of privileges within the protection class, and
  wherein the protection class dynamically binds the set of resources such that the set of privileges to the role is implicitly derived during run time from the privileges associated with the protection class bound to the role.

21. The system of claim 20, wherein the processor is further configured to:
  assign a new resource to one of the protection classes defined in the second data structure; and
  assign a set of privileges associated with the one of the protection classes to each of the roles in the first data structure.

22. The system of claim 21, wherein the processor is further configured to:
  dynamically assign the new resource to the protection class after the new resource is added.

23. The system of claim 22, wherein the new resource automatically inherits the set of privileges and the roles attached to the protection class during run time.

24. The system of claim 20, wherein the processor is further configured to:
  dynamically determine the set of privileges that are granted to the role at runtime.

25. The system of claim 20, wherein the first data structure is a role-user table which indicates the roles assigned to each member.

26. The system of claim 25, wherein the role-user table comprises:
  a role identification column which contains information that identifies each role supported by said system, and
  an identification column which contains information that identifies each member supported by said system.

27. The system of claim 20, wherein said second data structure is a role control list table comprising:
- a role identification column which contains information that identifies each role supported by said system,
- a protection class column which contains information on protection classes in the system, and
- a privilege set column which indicates one or more privileges granted to said each role within a given protection class.

* * * * *